US008396913B2

(12) United States Patent
Pu et al.

(10) Patent No.: US 8,396,913 B2
(45) Date of Patent: Mar. 12, 2013

(54) FAST FOURIER TRANSFORM ARCHITECTURE

(75) Inventors: Tianyan Pu, Singapore (SG); Lei Bi, Singapore (SG); Jerome Tjia, Singapore (SG)

(73) Assignee: NXP B.V., Eindhoven (NL)

( * ) Notice: Subject to any disclaimer, the term of this patent is extended or adjusted under 35 U.S.C. 154(b) by 882 days.

(21) Appl. No.: 11/911,088

(22) PCT Filed: Apr. 11, 2006

(86) PCT No.: PCT/IB2006/051101
§ 371 (c)(1),
(2), (4) Date: Sep. 21, 2009

(87) PCT Pub. No.: WO2006/109240
PCT Pub. Date: Oct. 19, 2006

(65) Prior Publication Data
US 2010/0011043 A1 Jan. 14, 2010

(30) Foreign Application Priority Data
Apr. 12, 2005 (EP) .................................. 05102867

(51) Int. Cl.
*G06F 17/14* (2006.01)
(52) U.S. Cl. ....................................................... 708/404
(58) Field of Classification Search .................. None
See application file for complete search history.

(56) References Cited

U.S. PATENT DOCUMENTS

| | | | |
|---|---|---|---|
| 5,168,460 A | 12/1992 | Tower | |
| 6,098,088 A | 8/2000 | He et al. | |
| 6,304,887 B1* | 10/2001 | Ju et al. | 708/404 |
| 6,401,162 B1* | 6/2002 | Nasserbakht | 711/5 |
| 7,461,114 B2 | 12/2008 | Nakazuru et al. | |
| 7,680,872 B2* | 3/2010 | Saado | 708/620 |
| 2003/0225806 A1* | 12/2003 | Hu et al. | 708/404 |
| 2004/0172435 A1 | 9/2004 | Goel | |
| 2004/0243656 A1* | 12/2004 | Sung et al. | 708/404 |
| 2005/0114420 A1 | 5/2005 | Gibb et al. | |
| 2006/0224651 A1* | 10/2006 | Madhavapeddi et al. | 708/404 |
| 2008/0208944 A1* | 8/2008 | Sung et al. | 708/404 |
| 2010/0011043 A1* | 1/2010 | Pu et al. | 708/404 |

FOREIGN PATENT DOCUMENTS

| | | |
|---|---|---|
| EP | 0 856 801 A1 | 5/1998 |
| WO | 02/069182 A1 | 9/2002 |

OTHER PUBLICATIONS

Reeder, T. et al. "Real Time Fourier Transform Experiments Using a 32 Tap Diode-Convolver Module," 1975 Ultrasonic Symposium Procs., IEEE, pp. 336-339 (1975).

Wold, E. et al. "Pipeline and Parallel-Pipeline FFT Processors for VLSI Implementations," IEEE Trans. on Computers, vol. c-33, No. 5, pp. 414-426 (May 1984).

Lin, Y-S. et al. "A Multi-Phase Shared Bus Structure for the Fast Fourier Transform,", Proc. of the Int'l. Symp. on Circuits and Systems, pp. 1575-1578(1993).

Garcia, J. et al. "VLSI Configurable Delay Commutator for a Pipeline Split Radix FFT Architecture," IEEE Trans. on Signal Processing, vol. 47, No. 11, pp. 3098-3107 (Nov. 1999).

(Continued)

*Primary Examiner* — David H Malzahn (57) ABSTRACT

A last fourier transform architecture has parallel data processing paths. Input data is applied to the parallel data processing paths in a repeating sequence, and processed in those paths. Data sequencers are used to combine the outputs from the data processing paths into the required sequence.

11 Claims, 9 Drawing Sheets

OTHER PUBLICATIONS

Moon, S. et al. "Area-Efficient Memory-Based Architecture for FFT Processing," Proc. of the 2003 IEEE Int'l. Symp. on Circuits and Systems, pp. V-101 (2003).

Petrovsky, A. et al. "Multi-pipeline Implementations of Real-Time Vector DFT," Proc. Euromicro Symposium on Digital System Design, pp. 326-333 (2004).

Han, W. et al. "Multiplier-less Based Parallel-Pipelined FFT Architectures for Wireless Communication Applications," 2005 IEEE Int'l. Conf. on Acoustics, Speech, and Signal Processing, pp. V45-V48 (2005).

Wang, Z. et al. "A Novel FFT Processor for OFDM UWB Systems," IEEE Asia Pacific Conf. on Circuits and Systems, pp. 374-377 (2006).

International Search Report for International patent appln. No. PCT/IB2006/051101 (Jul. 21, 2009).

International Preliminary Report on Patentability for International patent appln. No. PCT/IB2006/051101 (Aug. 4, 2009).

Office Action from European Patent Appln. No. 06727877.0 (Sep. 8, 2010).

* cited by examiner

FAST FOURIER TRANSFORM ARCHITECTURE

This invention relates to a method and an apparatus for performing a Fast Fourier Transform. The method and apparatus are also suitable for performing related operations, such as an Inverse Fast Fourier Transform.

Fast Fourier Transform and Inverse Fast Fourier Transform operations are widely used in signal processing applications, for example in digital communications systems, including wireless communications systems such as OFDM communications systems including the IEEE 802.11 family of communications systems and OFDM Ultra Wideband (UWB) communications systems.

U.S. Pat. No. 6,098,088 discloses a fast fourier transform processor architecture, based on a radix-$2^2$ single path delay feedback ($R2^2SDF$) architecture. Input data is applied to a series of pairs of butterfly means, each pair including a first type of butterfly and a second type of butterfly, with each having a feedback path from its output to its input. Until the end of the series is reached, the output of the second butterfly in each pair is applied to a multiplier, before the multiplier output is applied to the first butterfly in the subsequent pair.

In order to be able to use a fast fourier transform processor architecture in a data communications system such as an OFDM Ultra Wideband (UWB) communications system, the processor must be able to handle a high data rate. Moreover, the hardware cost of the processor is an important factor.

According to a first aspect of the invention, there is provided an apparatus for performing a fast fourier transform operation, the apparatus comprising:

an input, for receiving input data;
a plurality of first data processing paths, each being adapted to perform said fast fourier transform operation, and being connected to the input such that input data is applied to one of said data processing paths;
a first data scheduler, connected to receive outputs from each of said plurality of first data processing paths; and
at least one further fast fourier transform processor stage, comprising a plurality of second data processing paths;
wherein the first data scheduler is adapted to supply inputs to each of said plurality of second data processing paths of the further fast fourier transform processor stage from the outputs of each of said plurality of first data processing paths.

This has the advantage that the parallel structure allows a high data processing rate to be achieved, without requiring a corresponding increase in the hardware cost of the processor.

According to a first aspect of the present invention, there is provided an apparatus for performing a fast fourier transform operation, the apparatus comprising:

an input, for receiving input data;
a data processing path, adapted to perform said fast fourier transform operation, and connected to the input such that input data is applied to said data processing path;
wherein the data processing path comprises a plurality of butterfly circuits and a corresponding plurality of multipliers for receiving the outputs from the butterfly circuits, and wherein each of said multipliers comprises a pipelined CSD multiplier.

This allows a high data processing rate to be achieved, without requiring a corresponding increase in the hardware cost of the processor.

For an understanding of the invention, reference will now be made, by way of example only, to the accompanying drawings, in which:

FIGS. 1-1 and 1-2 show the structure of a fast fourier transform processor in accordance with a first aspect of the invention.

FIGS. 8-1 and 8-2 show the structure of a second fast fourier transform processor in accordance with the first aspect of the invention.

FIGS. 9-1 and 9-2 show the structure of a further fast fourier transform processor in accordance with the invention.

Figure 11:
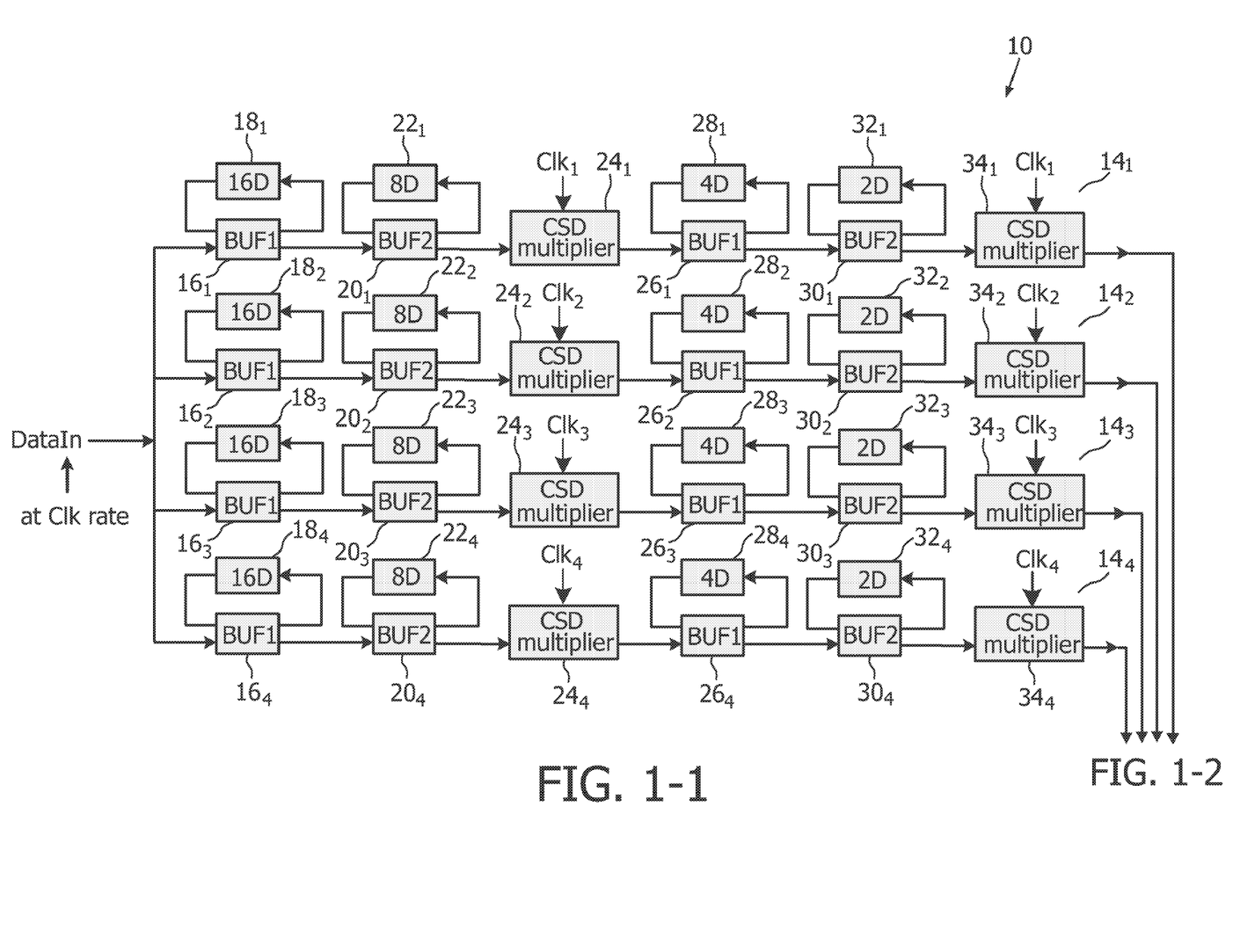
Figure 12:
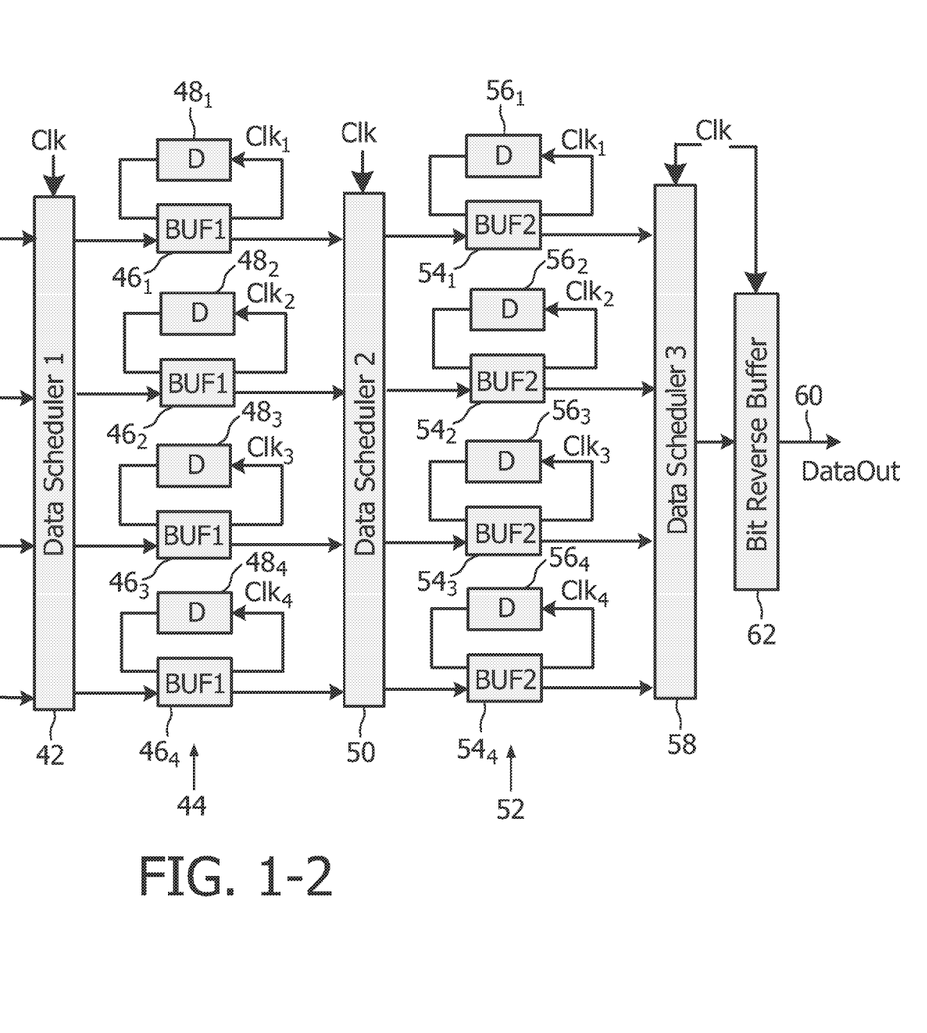

FIGS. 1-1 and 1-2 show a fast fourier transform processor 10. Input data, DataIn, at a data rate corresponding to the frequency of a clock signal Clk, is received on an input line 12. Input data is divided between four data processing paths $14_1$, $14_2$, $14_3$, $14_4$. The four data processing paths $14_1$, $14_2$, $14_3$, $14_4$ are essentially identical, and so only the first data processing path $14_1$ will be described in detail below. Features of the second, third and fourth data processing paths $14_2$, $14_3$, $14_4$, which are identical to corresponding features of the first data processing path $14_1$ are identified in FIG. 1-1 by identical reference numerals with subscripts referring to the number of the data processing path.

Although this embodiment of the invention has four parallel data processing paths, it will be apparent that other orders of parallelism can be used as required.

This illustrated embodiment of the invention shows a N=128 processor, although it will be apparent that the same principle can be applied to processors of other sizes.

Received data words of the input data are divided among the four data processing paths $14_1$, $14_2$, $14_3$, $14_4$ as will be described in more detail below. The four data processing paths $14_1$, $14_2$, $14_3$, $14_4$ are clocked by four different clock signals $Clk_1$, $Clk_2$, $Clk_3$, $Clk_4$, respectively.

Data received in the first data processing path $14_1$ is applied to a first butterfly $16_1$ of a first type, which has a sixteen word feedback register $18_1$ connected between its output and its input. Since there are four data processing paths, the required size of the first butterfly and feedback register is one eighth of the size of the FFT processor, rather than half of the size as in an architecture without parallel data processing paths. Thus, one eighth of N=128 requires a butterfly and a feedback register of sixteen words.

Output data from the first butterfly $16_1$ of a first type is applied to a first butterfly $20_1$ of a second type, which has an eight word feedback register $22_1$ connected between its output and its input.

The structure and operation of the butterflies of the first and second type are well known to the person skilled in the art, and will not be described in further detail. It will be noted that the first data processing path $14_1$ forms a radix-$2^2$ single path delay feedback ($R2^2SDF$) fast fourier transform processor architecture.

Output data from the first butterfly $20_1$ of the second type is applied to a first canonical signed digit (CSD) multiplier $24_1$, operating on the basis of a clock signal $Clk_1$. The canonical signed digit (CSD) multipliers $24_2$, $24_3$, $24_4$ in the other three data processing paths $14_2$, $14_3$, $14_4$ operate on the basis of respective clock signals $Clk_2$, $Clk_3$, $Clk_4$.

Figure 2:
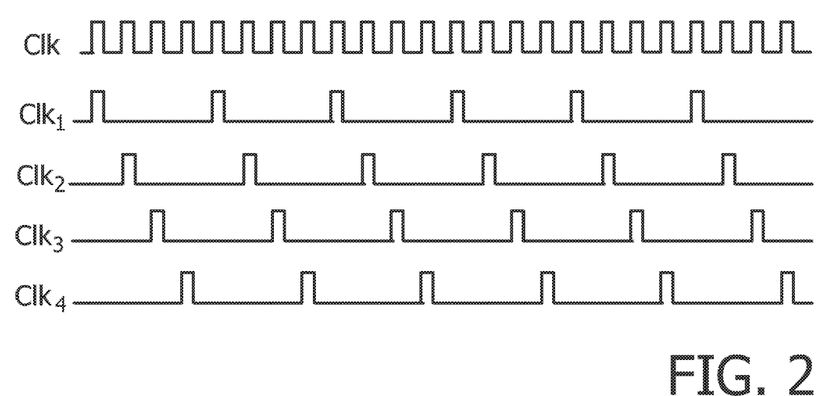
FIG. 2 illustrates clock signals in use in the processor of FIG. 1.

FIG. 2 illustrates the relationships between the various clock signals Clk, $Clk_1$, $Clk_2$, $Clk_3$, $Clk_4$. Specifically, the clock signals $Clk_1$, $Clk_2$, $Clk_3$, $Clk_4$ each contain pulses at one quarter of the frequency of the clock signal Clk. More specifically, the clock signal $Clk_1$ contains pulses corresponding to every fourth pulse in the clock signal Clk, the clock signal $Clk_2$ contains pulses corresponding to every fourth pulse in the clock signal Clk, but delayed by one pulse compared with the pulses in $Clk_1$, the clock signal $Clk_3$ contains pulses corresponding to every fourth pulse in the clock signal Clk, but delayed by one pulse compared with the pulses in $Clk_2$, and the clock signal $Clk_4$ contains pulses corresponding to every fourth pulse in the clock signal Clk, but delayed by one pulse compared with the pulses in $Clk_3$.

Figure 3:
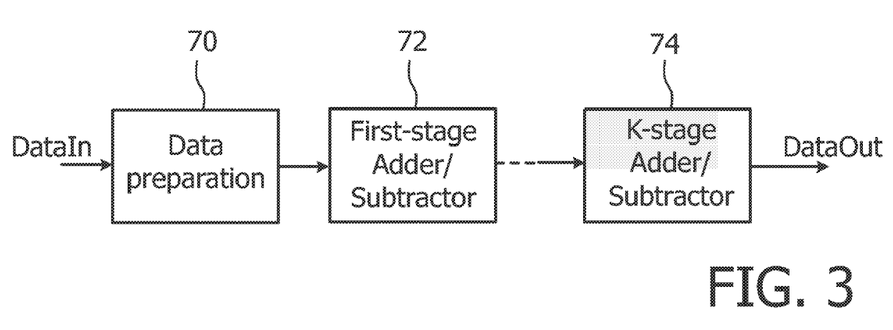
FIG. 3 is a schematic representation of a multiplier in the processor of FIG. 1.

The structure of the CSD multiplier is shown schematically in FIG. 3. Specifically, input data from the relevant butterfly is applied to a data preparation block 70, and then to a first-stage adder/subtractor 72. As is well known to the person skilled in the art, a CSD multiplier achieves desired multiplications by means of suitable add/subtract and shift operations. The number of stages in the CSD multiplier depends on the size of the data words. FIG. 3 shows a CSD multiplier with K stages, and shows the data eventually being passed to a Kth-stage adder/subtractor 74, and then to an output. The structure and operation of the CSD multiplier is well known to the person skilled in the art and will not be described in further detail.

The output from the first CSD multiplier $24_1$ is applied to a second butterfly $26_1$ of the first type, which has a four word feedback register $28_1$ connected between its output and its input. Output data from the second butterfly $26_1$ of the first type is applied to a second butterfly $30_1$ of the second type, which has a two word feedback register $32_1$ connected between its output and its input.

Output data from the second butterfly $30_1$ of the second type is applied to a second CSD multiplier $34_1$, operating on the basis of a clock signal $Clk_1$. The CSD multipliers $34_2$, $34_3$, $34_4$ in the other three data processing paths $14_1$, $14_2$, $14_3$ operate on the basis of respective clock signals $Clk_2$, $Clk_3$, $Clk_4$. The structures of the CSD multipliers are as shown schematically in FIG. 3.

The output from the second CSD multiplier $34_1$ is applied to a third butterfly $36_1$ of the second type, which has a one word feedback register $38_1$ connected between its output and its input. It will be noted that, because of the size of the processor in this case, there is no need for a butterfly of the first type before the third butterfly $36_1$ of the second type.

Output data from the third butterfly $36_1$ of the second type is applied to a third CSD multiplier $40_1$, operating on the basis of a clock signal $Clk_1$. The CSD multipliers $40_2$, $40_3$, $40_4$ in the other three data processing paths $14_1$, $14_2$, $14_3$ operate on the basis of respective clock signals $Clk_2$, $Clk_3$, $Clk_4$. The structures of the CSD multipliers are as shown schematically in FIG. 3.

Output data from the third CSD multipliers $40_1$, $40_2$, $40_3$, $40_4$ in the four data processing paths $14_1$, $14_2$, $14_3$, $14_4$ are applied to a first data scheduler 42, operating on the basis of the clock signal Clk. The first data scheduler 42 operates to ensure that data is applied in the correct sequence to a first further fast fourier transform processor stage 44.

As in the initial stage made up of the four data processing paths $14_1$, $14_2$, $14_3$, $14_4$, the first further fast fourier transform processor stage 44 has four data processing paths, each including a respective butterfly $46_1$, $46_2$, $46_3$, $46_4$ of the first type, having a respective one word feedback register $48_1$, $48_2$, $48_3$, $48_4$ connected between its output and its input, operating on the basis of the respective clock signals $Clk_1$, $Clk_2$, $Clk_3$, $Clk_4$.

Output data from the first further fast fourier transform processor stage 44 is applied to a second data scheduler 50, operating on the basis of the clock signal Clk. The second data scheduler 50 operates to ensure that data is applied in the correct sequence to a second further fast fourier transform processor stage 52.

The second further fast fourier transform processor stage 52 has four data processing paths, each including a respective butterfly $54_1$, $54_2$, $54_3$, $54_4$ of the first type, having a respective one word feedback register $56_1$, $56_2$, $56_3$, $56_4$ connected between its output and its input, operating on the basis of the respective clock signals $Clk_1$, $Clk_2$, $Clk_3$, $Clk_4$.

Output data from the second further fast fourier transform processor stage 52 is applied to a third data scheduler 58, operating on the basis of the clock signal Clk. The third data scheduler 58 operates to ensure that data is applied in the correct sequence to an output line 60, although, in this embodiment of the invention, the output data is applied via a bit reverse buffer 62.

As mentioned previously, received data samples of the input data are divided between the four data processing paths $14_1$, $14_2$, $14_3$, $14_4$.

More specifically, received data words of the input data are divided between the four data processing paths $14_1$, $14_2$, $14_3$, $14_4$ in a repeating sequence. For example, the first, fifth, ninth, thirteenth etc word of each block of input data may be applied to the first data processing path $14_1$, the second, sixth, tenth etc word of each block of input data may be applied to the second data processing path $14_2$, the third, seventh, eleventh etc word of each block of input data may be applied to the third data processing path $14_3$, and the fourth, eighth, twelfth etc word of each block of input data may be applied to the fourth data processing path $14_2$. The method by which these groups of words are distributed amongst the data processing paths has an impact on the operation of the first data scheduler 42, as will be apparent.

Figure 4:
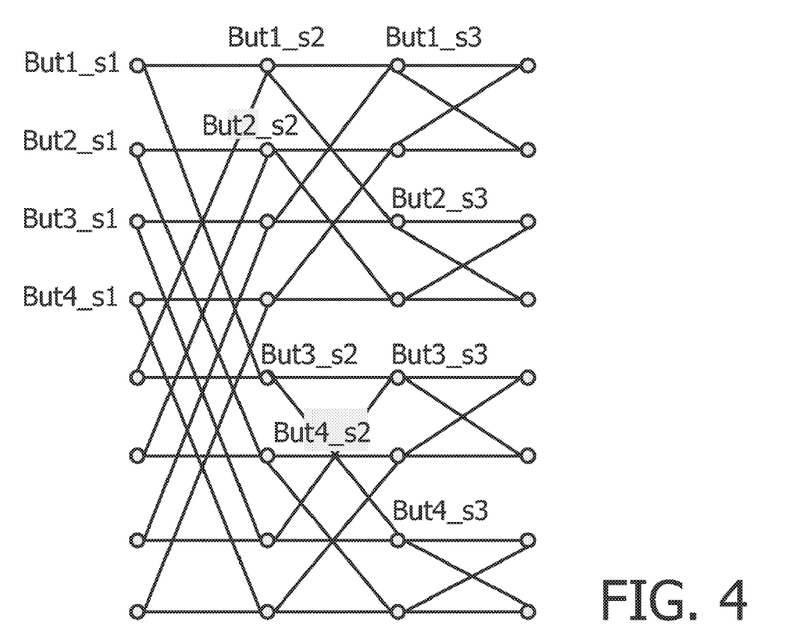
FIG. 4 illustrates a method for the input of data into the processor of FIG. 1.

FIG. 4 shows the flow graph in the case of an N=8 FFT. There are four butterfly operations in the first stage ($but1_{s1}$, $but2_{s1}$, $but3_{s1}$ and $but4_{s1}$), four in the second stage ($but1_{s2}$, $but2_{s2}$, $but3_{s2}$ and $but4_{s2}$), and four in the third stage ($but1_{s3}$, $but2_{s3}$, $but3_{s3}$ and $but4_{s3}$). If this processor were to be implemented in accordance with the present invention, with two parallel data processing paths, one possibility would be to schedule the first and third operations at each stage ($but1_{s1}$, $but3_{s1}$; $but1_{s2}$, $but3_{s2}$; $but1_{s3}$, $but3_{s3}$) to the first path, and the second and fourth operations ($but2_{s1}$, $but4_{s1}$; $but2_{s2}$, $but4_{s2}$; $but2_{s3}$, $but4_{s3}$) to the second path.

Figure 5:
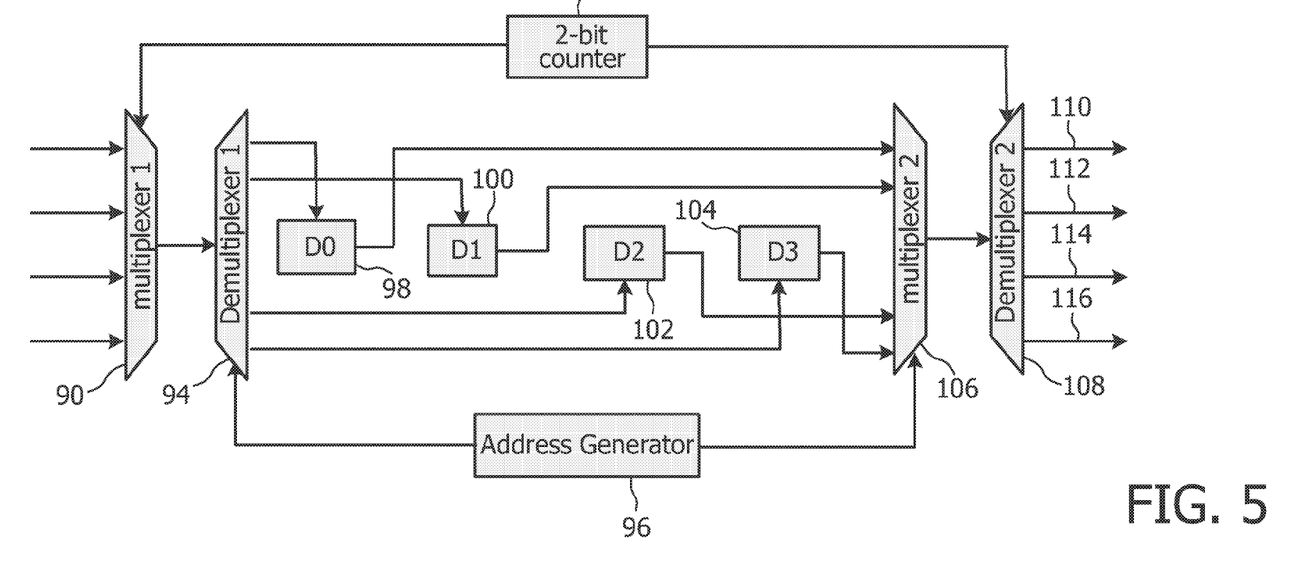
FIG. 5 is a block schematic diagram, showing the structure of a data scheduler in the processor of FIG. 1.

FIG. 5 is a block schematic diagram, showing in more detail the structure of each of the data schedulers 42, 50, 58. These function such that the data output from the previous stage is presented in the correct sequence to the next butterfly stage (in the case of the first two data schedulers 42, 50) or to the bit reverse buffer (in the case of the third data scheduler 58).

Input data from the four parallel data processing paths of the preceding stage are supplied to a first multiplexer 90. Based on an input from a 2-bit counter 92, one of the four input words is applied to a first demultiplexer 94. Based on an input from an address generator 96, the word applied to the first demultiplexer 94 is passed to one of four registers (D0) 98, (D1) 100, (D2) 102, (D3) 104.

The values stored in the four registers 98, 100, 102, 104 are applied to a second multiplexer 106. Based on an input from the address generator 96, one of the four input words is applied to a second demultiplexer 108. Based on an input from the 2-bit counter 92, the word applied to the second demultiplexer 108 is passed on one of four output lines 110, 112, 114, 116, which act as inputs to the subsequent data processing stage.

However, in the case of the third data scheduler 58, which passes its output to the bit reverse buffer 62, the second demultiplexer 108 may not be required, depending on the agreed interface between the data processing paths and the bit reverse buffer 62.

The 2-bit counter 92 acts to clock data words in from the four data processing paths of the preceding stage in turn, and to clock data words out to the four data processing paths of the subsequent stage in turn. The registers 98, 100, 102, 104 store the data words that have been clocked in through the first multiplexer 90.

The address generator 96 operates such that data words are clocked out of the data scheduler in the correct desired sequence, even though that desired sequence differs from the sequence in which the data words were received.

The sequence of addresses, generated by the address generator 96, is such that data words are stored in the registers 98, 100, 102, 104 in such a way as to achieve this. In this illustrated example, each address generated by the address generator 96 is used to control both the first demultiplexer 94 and the second multiplexer 106. That is, as one word of data is stored in one of the registers from the first demultiplexer 94, the second multiplexer 106 selects the previously stored word of data from that register for output.

Alternative embodiments of the invention are also possible, in which the address generator 96 generates different sequences of addresses to control the first demultiplexer 94 and the second multiplexer 106, although these may require the use of more registers to store the data words.

Figure 6:
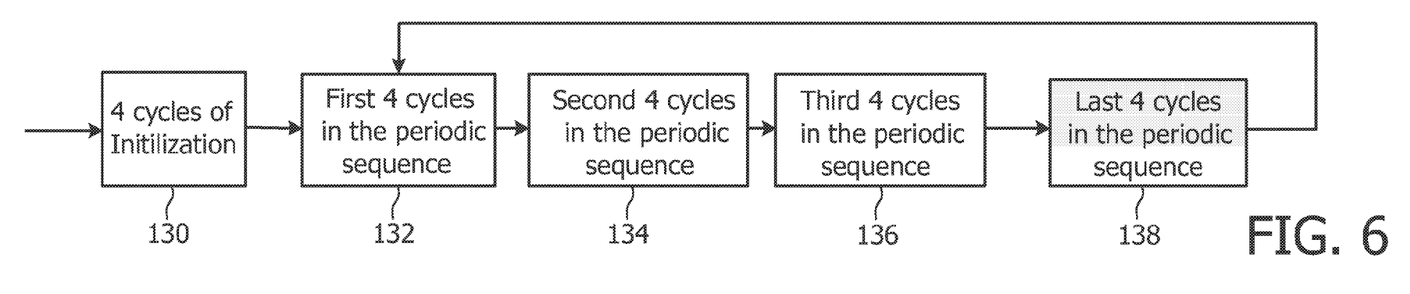
FIG. 6 is a schematic representation of the operation of an address generator in the data scheduler of FIG. 5.

It has been found that the required sequences of addresses are periodic, after an initialization period, with the period length being a multiple of four clock cycles (in this illustrated example where there are four parallel data processing paths). FIG. 6 illustrates an example where the period length is sixteen clock cycles. Thus, the required sequence of addresses, output from the address generator 96, contains four cycles of initialization 130, followed by four further blocks 132, 134, 136, 138, each of four cycles. After the fourth further block 138, the sequence returns to the first further block 132.

Figure 7:
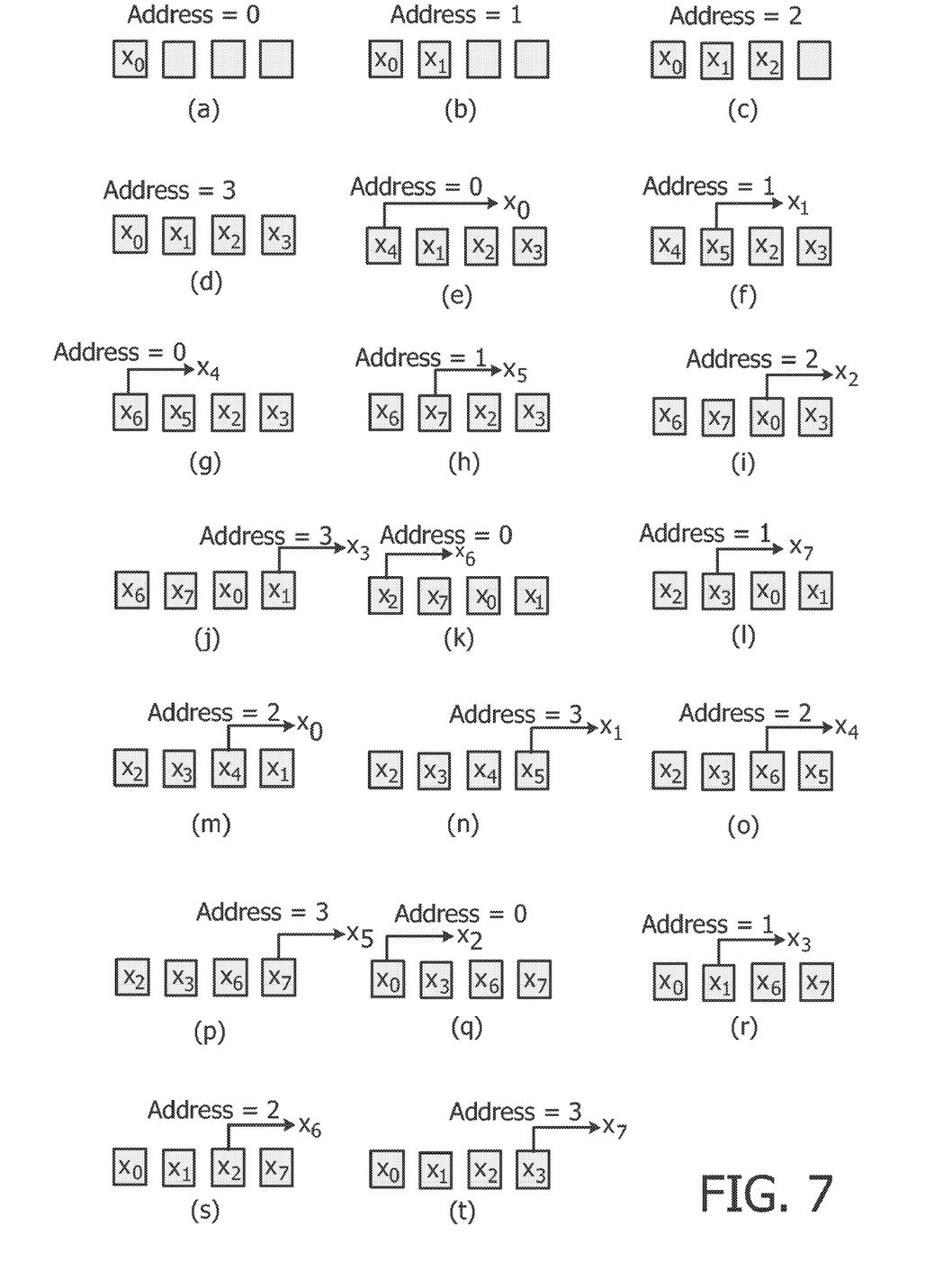
FIG. 7 illustrates the operation of the data scheduler of FIG. 5.

FIG. 7 illustrates the operation of the data scheduler 42, and the address generator 96 thereof in particular, in the embodiment of the invention illustrated in FIG. 1. Specifically, in the case of the data scheduler 42, this is required to receive data words from the four data processing paths in the sequence $x_0$ $x_1$ $x_2$ $x_3$ $x_4$ $x_5$ $x_6$ $x_7$ and to supply outputs to the butterflies $46_1$, $46_2$, $46_3$, $46_4$ in the sequence $x_0$ $x_1$ $x_4$ $x_5$ $x_2$ $x_3$ $x_6$ $x_7$. FIGS. 7(a)-(t) show the data words stored in the four registers 98, 100, 102, 104 after each of twenty clock cycles.

Thus, in the first cycle, the address generator 96 generates the address "0", indicating the register (D0) 98, and the first data word in the received sequence, $x_0$, is stored in D0, as shown in FIG. 7(a). In the second cycle, the address generator 96 generates the address "1", indicating the register (D1) 100, and the second data word in the received sequence, $x_1$, is stored in D1, as shown in FIG. 7(b). Thus after four cycles of initialization, as shown in FIG. 7(d), the first four received data words $x_0$ $x_1$ $x_2$ $x_3$ are stored in the four registers respectively.

In the fifth cycle, as shown in FIG. 7(e), it is desired to output the data word $x_0$, as this is the first data word of the output sequence. The address generator 96 therefore generates the address "0", indicating the register (D0) 98, as this is where the data word is stored. At this time, the next received data word is the fifth data word $x_4$ of the received sequence, and so this is stored in the register (D0) 98.

Similarly, in the sixth cycle, as shown in FIG. 7(f), it is desired to output the data word $x_1$, as this is the second data word of the output sequence. The address generator 96 therefore generates the address "1", indicating the register (D1) 100, as this is where that data word is stored. At this time, the next received data word is the sixth data word $x_5$ of the received sequence, and so this is stored in the register (D1) 100.

The process continues in this way, with each sub-Figure in FIG. 7 showing the address generated by the address generator 96, the data word that is output from the register indicated by that address, and the resulting contents of the registers D0-D3. After a total of twenty cycles, that is, after four cycles of initialization and sixteen further cycles, the contents of the registers D0-D3 have returned to their values after the four cycles of initialization.

This means that the required sequence of addresses is periodic, with a period of sixteen cycles. That is, it will be seen from FIG. 7 that the addresses required in the four cycles of initialization are 0123, and that, in the sixteen further cycles, they are 0101-2301-2323-0123. The sequence of addresses from these sixteen further cycles should then be repeated in each subsequent block of sixteen cycles.

In the case of the second data scheduler 50, this is required to receive data words from the four data processing paths in the sequence $x_0$ $x_1$ $x_4$ $x_5$ $x_2$ $x_3$ $x_6$ $x_7$ and to supply outputs to the butterflies $54_1$, $54_2$, $54_3$, $54_4$ in the sequence $x_0$ $x_2$ $x_4$ $x_1$ $x_3$ $x_5$ $x_7$. By computer simulation or by manual calculation, it can be seen that the required sequence of addresses from the address generator 96, after four cycles of initialization with the addresses 0123, is 0022-1032-1133-0123. Again, therefore, the required sequence of addresses is periodic, with a period of sixteen cycles.

In the case of the third data scheduler 58, this is required to receive data words from the four data processing paths in the sequence $x_0$ $x_2$ $x_4$ $x_6$ $x_1$ $x_3$ $x_5$ $x_7$ and to supply outputs to the bit reverse buffer 58 in the sequence $x_0$ $x_1$ $x_2$ $x_3$ $x_4$ $x_5$ $x_6$ $x_7$. Again, the required sequence of addresses can be determined by computer simulation or by manual calculation, and, in this case, it is found to be periodic, with a period of twenty-four cycles. More specifically, it can be determined that the required sequence of addresses from the address generator 96, after four cycles of initialization with the addresses 0123, is 0010-2130-2212-3102-3313-0123.

The required sequences of addresses have been given for this example. However, where the size of the FFT processor is different from that illustrated, or where there are more or fewer than four parallel data processing paths, the required sequences of addresses will differ. In every case, however, the required sequences of addresses can be deduced from the need to provide output data words in a particular order.

There is therefore shown a FFT processor which has a high data throughput rate, without requiring large amounts of additional hardware resources.

As will be appreciated by the person skilled in the art, the FFT processor architecture in accordance with the present invention can be used in an Inverse Fast Fourier Transform (IFFT) processor, by adding modules for conjugating the input samples and the output samples.

In order to allow an even higher data throughput rate to be achieved, the CSD multipliers shown in FIGS. 1-1 and 1-2 can be replaced by pipelined CSD multipliers. FIGS. 8-1 and 8-2 therefore show an alternative embodiment of the invention. Elements of the FFT processor 210 of FIGS. 8-1 and 8-2, that are identical to elements of the FFT processor of FIGS. 1-1 and 1-2, are indicated by the same reference numerals.

Figure 81:
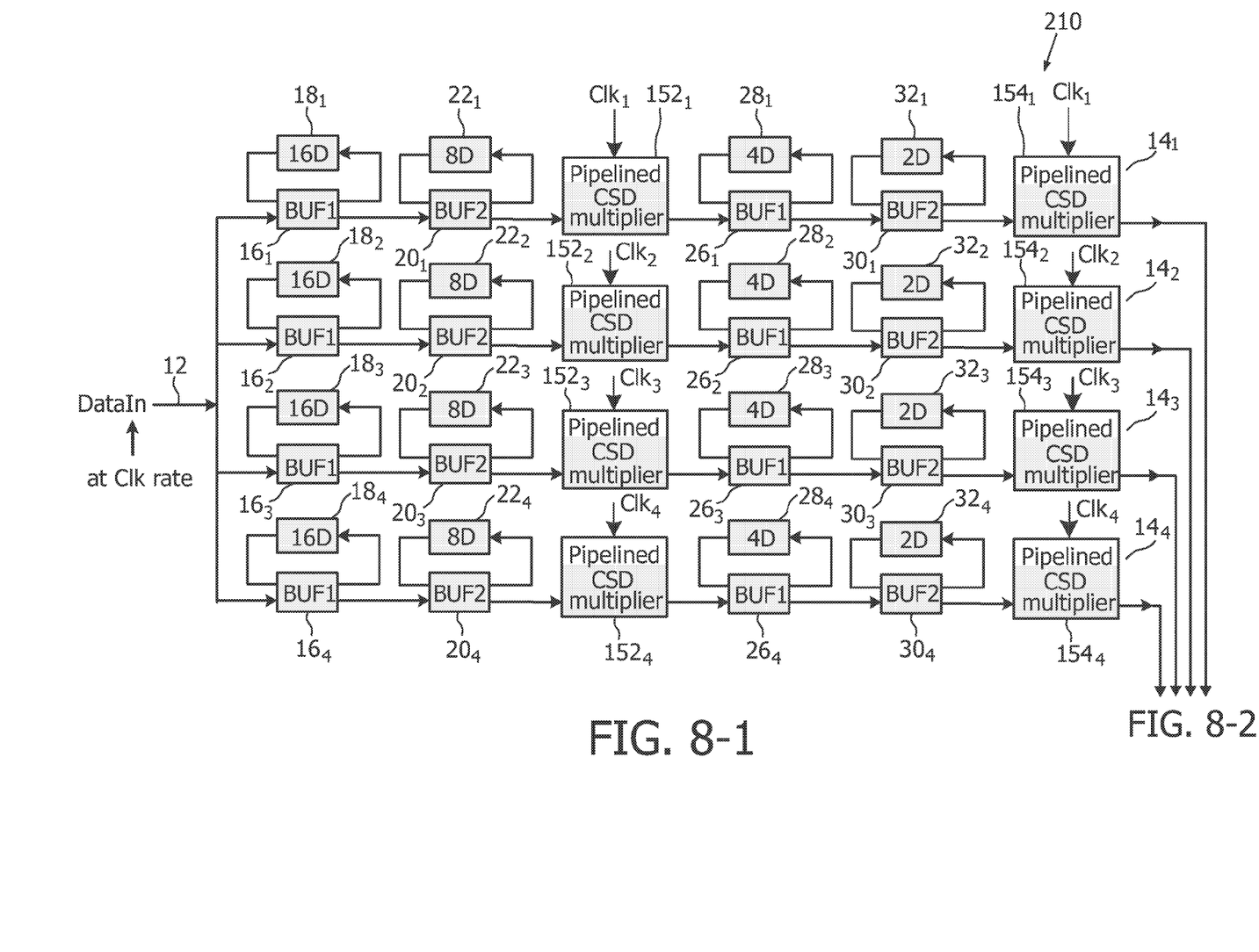

Output data from the first butterflies $20_1$, $20_2$, $20_3$, $20_4$ of the second type is applied to respective first pipelined CSD multipliers $152_1$, $152_2$, $152_3$, $152_4$ operating on the basis of respective clock signals $Clk_1$, $Clk_2$, $Clk_3$, $Clk_4$. Output data from the second butterflies $30_1$, $30_2$, $30_3$, $30_4$ of the second type is applied to respective second pipelined CSD multipliers $154_1$, $154_2$, $154_3$, $154_4$ operating on the basis of respective clock signals $Clk_1$, $Clk_2$, $Clk_3$, $Clk_4$. Output data from the third butterflies $36_1$, $36_2$, $36_3$, $36_4$ of the second type is applied to respective third pipelined CSD multipliers $156_1$, $156_2$, $156_3$, $156_4$, again operating on the basis of respective clock signals $Clk_1$, $Clk_2$, $Clk_3$, $Clk_4$.

The structure of each of the pipelined CSD multipliers is of a type which will be apparent to the person skilled in the art. As is known, the multiplier can be pipelined at a bit level, or at a word level. If the multiplier is to be pipelined at a word level, the data is registered at the output of each stage, so that the critical path can be fixed within one adder.

Figure 82:
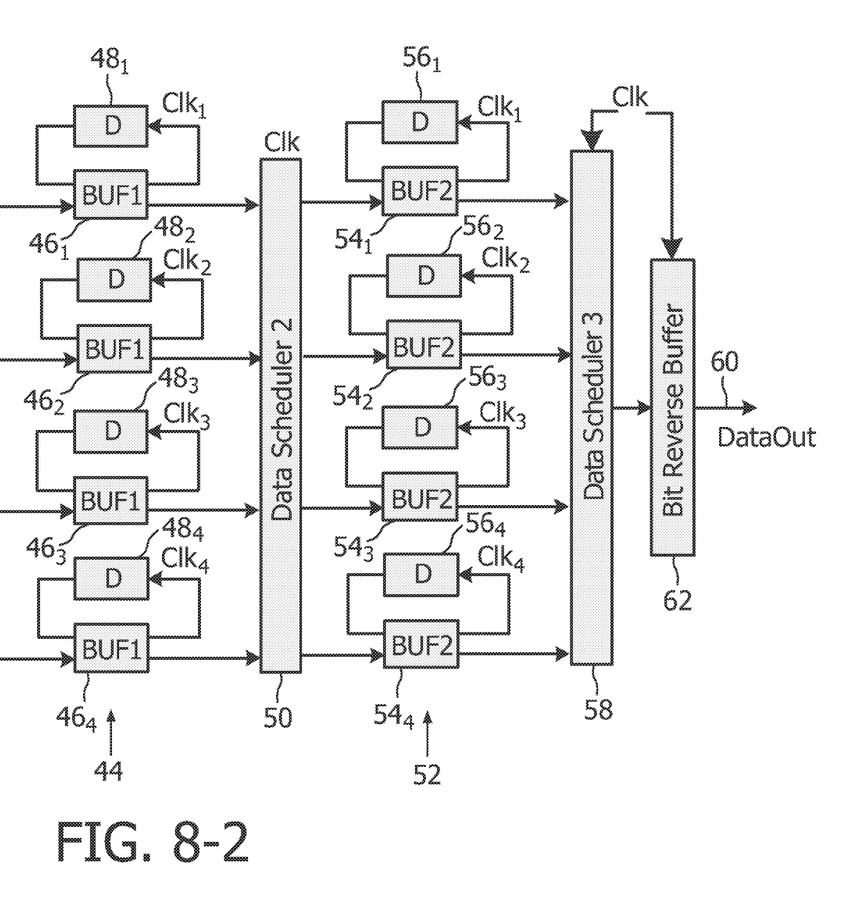

In this embodiment of the invention, since the data schedulers 42, 50, 58 are operating at high clock speeds, they can be pipelined if necessary or desirable.

FIGS. 9-1 and 9-2 show a further embodiment of the invention. Elements of the FFT processor 220 of FIGS. 9-1 and 9-2, that are identical to elements of the FFT processor of FIGS. 1-1 and 1-2, are indicated by the same reference numerals.

Figure 91:
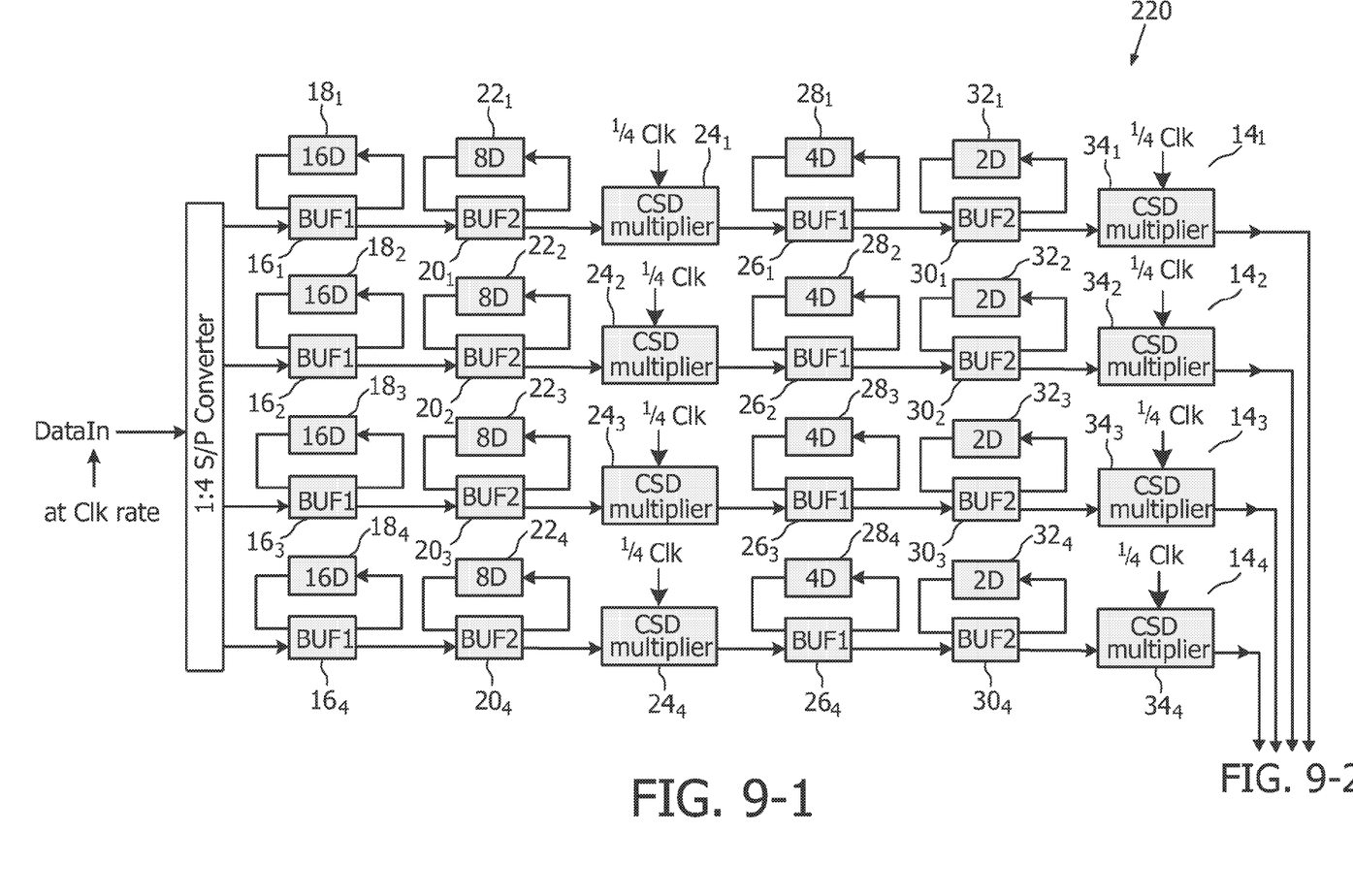

In this embodiment of the invention, the input data, DataIn, at the frequency of the clock signal Clk, are applied to a 1:4 Serial-Parallel Converter 222. The Serial-Parallel Converter 222 takes the received serial data stream, and converts it into four parallel data streams, that are then applied to the four parallel data processing paths $14_1$, $14_2$, $14_3$, $14_4$. The data is then processed in these four parallel data processing paths in the same way as in the embodiment shown in FIG. 1, except that each of the CSD multipliers $24_1$, $24_2$, $24_3$, $24_4$ operates on the basis of the same clock signal, namely a clock signal at one quarter of the frequency (¼ Clk) of the clock signal Clk. Similarly, the other CSD multipliers $34_1$, $34_2$, $34_3$, $34_4$; $40_1$, $40_2$, $40_3$, $40_4$ also operate on the basis of that same clock signal ¼ Clk.

The outputs from the four parallel data processing paths $14_1$, $14_2$, $14_3$, $14_4$ are then applied to the first data scheduler 226, which can be simplified compared to the first data scheduler 42 of FIG. 1, since it is receiving inputs from four paths that are all operating in the same clock domain. The data scheduler 226 includes four registers, and allows input data to be stored into the registers and allows input data and stored data to be supplied as output data.

Taking the first data scheduler 226 as an example, during initialization, four data words $x_0$ $x_1$ $x_2$ $x_3$ are received in parallel from the four parallel data processing paths, and stored in the four registers. During the next clock cycle, the next four data words $x_4$ $x_5$ $x_6$ $x_7$ are received. In order to achieve the required output data sequence, two of the newly received data words $x_6$ $x_7$ are stored in the two registers where the data words $x_0$ $x_1$ are presently stored, while the other two of the newly received data words $x_4$ $x_5$ are output together with the data words $x_0$ $x_1$.

Figure 92:
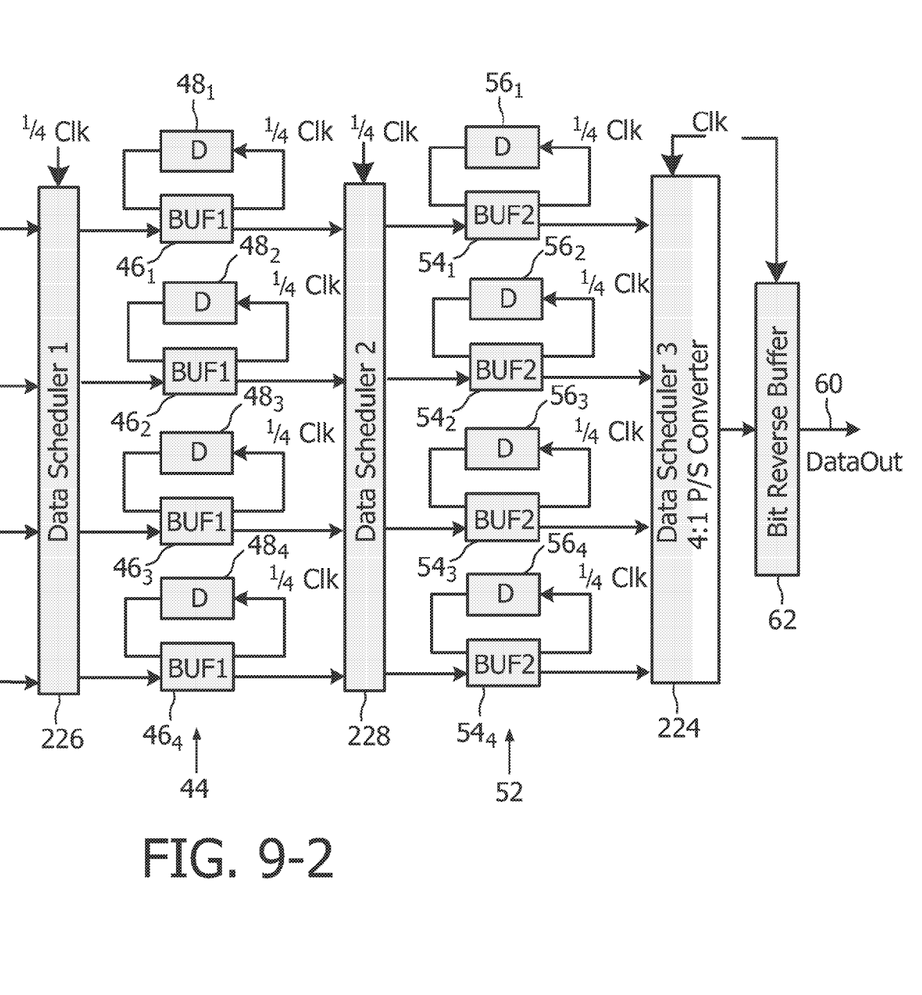

During the next clock cycle, when the next four data words $x_0$ $x_1$ $x_2$ $x_3$ are received, they are stored in the four registers, while the presently stored data words $x_6$ $x_7$ $x_2$ $x_3$ are output. This sequence then repeats, and so it can be seen that the input data sequence $x_0$ $x_1$ $x_2$ $x_3$ $x_4$ $x_5$ $x_6$ $x_7$ is converted to the desired output data sequence $x_0$ $x_1$ $x_4$ $x_5$ $x_2$ $x_3$ $x_6$ $x_7$. Similar operations are carried out in the second data scheduler 228, and in the data scheduler section of the block 224, which also acts as a 4:1 Parallel-Serial Converter so that the data can be applied to the bit reverse buffer 62 in the required form.

The operation of the system 220 is therefore essentially the same as the operation of the system 10 shown in FIG. 1, except that there are only two clock domains, rather than five.

This same modification can also be made to the architecture shown in FIG. 8. That is, by converting the input data to parallel form, and by modifying the data schedulers as described with reference to FIG. 9, the pipelined CSD multipliers $152_1$, $152_2$, $152_3$, $152_4$; $154_1$, $154_2$, $154_3$, $154_4$; $156_1$, $156_2$, $156_3$, $156_4$ can be allowed to operate on the basis of a common clock signal, namely a clock signal at one quarter of the frequency (¼ Clk) of the clock signal Clk.

There are therefore described FFT architectures which allow processing of input data at high data rates, without requiring large increases in hardware cost.

The invention claimed is:

1. An apparatus for performing a fast fourier transform operation, the apparatus comprising: a plurality of first data processing elements, each being configured to receive input data and perform at least a portion of said fast fourier transform operation; a first data scheduler, connected to receive outputs from each of said plurality of first data processing elements; and at least one further fast fourier transform processor, comprising a plurality of second data processing elements; wherein the first data scheduler is configured to supply inputs to each of said plurality of second data processing elements of the further fast fourier transform processor from the outputs of each of said plurality of first data processing elements, wherein: each of said first data processing elements comprises a plurality of butterfly circuits and a corresponding plurality of multipliers for receiving the outputs from the butterfly circuits, and wherein said apparatus further comprises: a plurality of second data schedulers; and a plurality of second fast fourier transform processors, each connected to receive input signals from a respective one of said plurality of second data schedulers, wherein each of said first data processing elements is a radix $2^2$ single path delay-feedback fast fourier transform processor, wherein at least one of said plurality of butterfly circuits comprises a pair of first and second butterfly means with a respective feedback path from an output of said butterfly means to an input thereof.

2. The apparatus as claimed in claim 1, wherein each of said multipliers comprises a CSD multiplier.

3. The apparatus as claimed in claim 2, wherein each of said multipliers comprises a pipelined CSD multiplier.

4. The apparatus as claimed in claim 1, wherein the or each of said second data schedulers comprises: a first multiplexer, for receiving input data in parallel, and for supplying first multiplexer output data; a first demultiplexer, for receiving the first multiplexer output data, and for supplying the received first multiplexer output data to a plurality of registers in accordance with a first control signal; a second demultiplexer, for supplying output data in parallel; a second multiplexer, for receiving data from said plurality of registers, and for supplying the data received from said plurality of registers to said second demultiplexer in accordance with a second control signal; and an address generator, for supplying said first control signal to said first demultiplexer, and for supplying said second control signal to said second multiplexer, such that the output data format has a known relationship to the input data format.

5. The apparatus as claimed in claim 1, comprising a serial-parallel converter, for receiving input serial data, and applying the received data to said plurality of first data processing elements in parallel.

6. The apparatus as claimed in claim 1, wherein received data words of said input data are applied to said plurality of first data processing elements in a repeating sequence.

7. An apparatus for performing a fast fourier transform operation, the apparatus comprising: a plurality of first data processing elements, each being configured to receive input data and perform at least a portion of said fast fourier transform operation; a first data scheduler, connected to receive outputs from each of said plurality of first data processing elements; and at least one further fast fourier transform processor, comprising a plurality of second data processing elements; wherein the first data scheduler is configured to supply inputs to each of said plurality of second data processing elements of the further fast fourier transform processor from the outputs of each of said plurality of first data processing elements, wherein: each of said first data processing elements comprises a plurality of butterfly circuits and a corresponding plurality of multipliers for receiving the outputs from the butterfly circuits, and wherein said apparatus further comprises: a plurality of second data schedulers; and a plurality of second fast fourier transform processors, each connected to receive input signals from a respective one of said plurality of second data schedulers, wherein the or each of said second data schedulers comprises: a first multiplexer, for receiving input data in parallel, and for supplying first multiplexer output data; a first demultiplexer, for receiving the first multiplexer output data, and for supplying the received first multiplexer output data to a plurality of registers in accordance with a first control signal; a second demultiplexer, for supplying output data in parallel; a second multiplexer, for receiving data from said plurality of registers, and for supplying the data received from said plurality of registers to said second demultiplexer in accordance with a second control signal; and an address generator, for supplying said first control signal to said first demultiplexer, and for supplying said second control signal to said second multiplexer, such that the output data format has a known relationship to the input data format.

8. The apparatus as claimed in claim 7, wherein each of said multipliers comprises a CSD multiplier.

9. The apparatus as claimed in claim 8, wherein each of said multipliers comprises a pipelined CSD multiplier.

10. The apparatus as claimed in claim 7, comprising a serial-parallel converter, for receiving input serial data, and applying the received data to said plurality of first data processing elements in parallel.

11. The apparatus as claimed in claim 7, wherein received data words of said input data are applied to said plurality of first data processing elements in a repeating sequence.

* * * * *